A. E. WHITTIER.
OVEN THERMOMETER.
APPLICATION FILED JAN. 19, 1915.

1,151,638.

Patented Aug. 31, 1915.

Witnesses:
Myrtle E. Fallow
Wm. E. O'Brien

Inventor:
Albert E. Whittier
Harry R. William
att.

UNITED STATES PATENT OFFICE.

ALBERT E. WHITTIER, OF BRISTOL, CONNECTICUT.

OVEN-THERMOMETER.

1,151,638.  Specification of Letters Patent.  Patented Aug. 31, 1915.

Application filed January 19, 1915. Serial No. 3,047.

*To all whom it may concern:*

Be it known that I, ALBERT E. WHITTIER, a citizen of the United States, residing at Bristol, in the county of Hartford and State of Connecticut, have invented a new and useful Improvement in Oven-Thermometers, of which the following is a specification.

This invention relates to those devices which are designed to be placed in openings in the walls of baking oven and similar heating or drying chambers for the purpose of indicating on the outside the temperature in the interior.

The object of this invention is to produce a very simple, cheap and efficient device which has the thermostatic means so arranged and so acting upon the indicating means, that the pointer will be held in exact position and will be moved uniformly and steadily in either direction according to the variation of the temperature. In attaining this end two very thin arms of common thermometric material are arranged and connected with the indicating means in such manner that while they work in conjunction with each other, each acts so as to compensate or to an extent control the action of the other. As one arm pushes the other arm gives away and allows the mechanism to turn the pointer, thus there is a compensating action, the movement of the pointer being the result of the action of the two arms. This holds the pointer steadily, there being no back-lash or looseness, and produces a steady uniform motion when the pointer turns under the variations of temperature without any mechanical joint between the ends of the thermometric arms and pointer connections.

Figure 1:
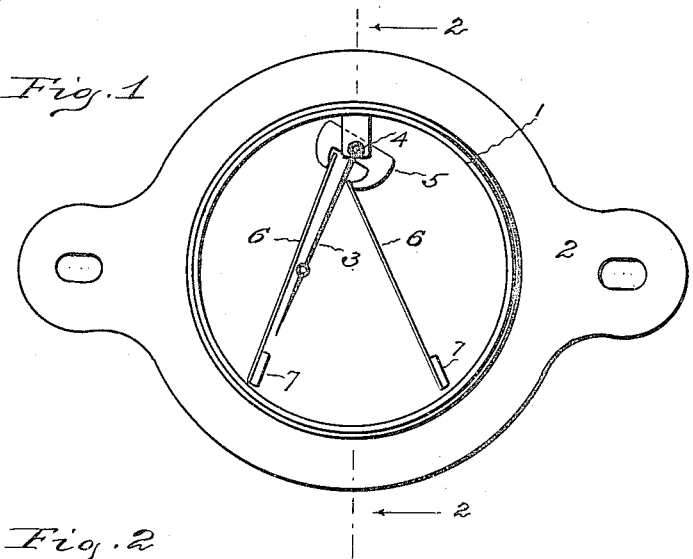
Figure 2:
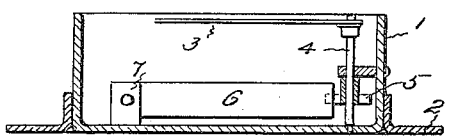
Figure 3:
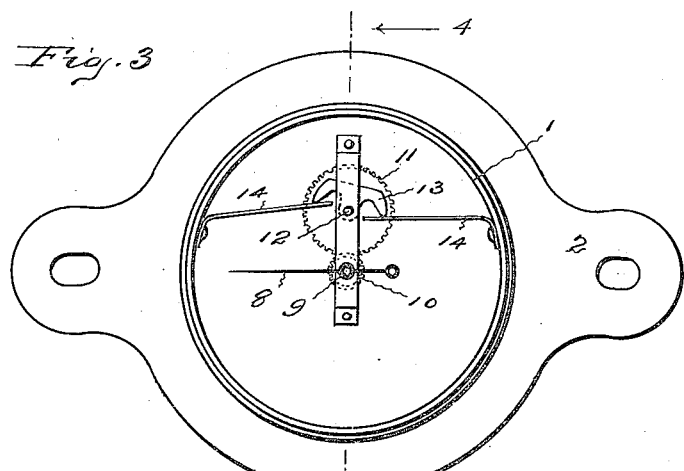
Figure 4:
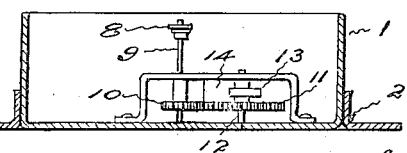

Figure 1 of the accompanying drawings shows a plan of a thermometer which embodies this invention with the cover and dial omitted, the arrangement of parts being in this case the preferred form when applied to a thermometer in which the indicating pointer is hung at one end and oscillates over the dial. Fig. 2 shows a section on the plane indicated by the dotted line 2—2 on Fig. 1. Fig. 3 shows a plan of the back plate and the mechanism of a thermometer which embodies this invention arranged for use in connection with a device in which the indicating pointer is hung at the center and rotates over the dial. Fig. 4 shows a section on the plane indicated by the dotted line 4—4 on Fig. 3.

These thermometers usually have a casing 1 which is designed to fit an opening through the wall of the oven, and a back plate 2 of thin sheet metal adapted to be fastened to the inside of the wall of the oven. In the first form of thermometer illustrated in the drawings the pointer 3 has one end fastened to the spindle 4 which is mounted in the casing near one side so that as the spindle is turned the pointer swings one way or the other. Fastened on the spindle is a yoke or pallet 5. Engaging with the ends of the pallet are the inner and free ends of two thin arms 6 each made of two different metals so that they warp when heated. The outer ends of these arms are attached to the lugs 7 which are fastened to the casing in any desired way. The free ends of these arms extend between the ends of the pallet and bear there-against in opposite directions, but they are arranged so that they tend to warp and straighten in the same direction as the temperature varies. The ends of the arms only bear loosely against the ends of the pallet, and as the arms warp in the same direction, rotarily, with relation to the rotary movement of the pallet, and they press oppositely with relation to the rotary movement of the pallet, only one arm at a time acts to turn the pallet; the other arm simply gets out of the way. This arrangement permits of a very simple construction and one which is exceedingly sensitive, for the sheets from which the thermometric arms are formed may be rolled very thin so that they are light and easily influenced by changes of temperature. The pallet with which the arms engage is a simple part to make and it is easily fastened to the spindle which carries the pointer.

With the thermometric arms engaged with the pallet as shown, when they warp and curl the free end of one pushes one way to turn the pallet spindle and pointer and the other yields in the same direction, and when the arms straighten the one which formerly yielded then pushes the pallet back while the other yields. This keeps a tension on the pallet at all times so there is no looseness or swinging of the pointer, without requiring any mechanical joint or connection being made between the pallet and the arms, and furthermore the action is uniform and regular as the undue warping of one arm might be counteracted by the action of the other arm so that the indicating movement of the pointer is the resultant of the action of the two arms.

In the second form illustrated the parts are arranged for a thermometer in which the pointer 8 is placed on a spindle 9 that is mounted at the center so that the pointer rotates in indicating rather than oscillates as in the first form. To multiply this movement a pinion 10 is fixed on the spindle and engaged with this pinion is a gear 11 on the arbor 12 which carries a yoke or pallet 13. Engaging with the ends of this pallet are the free inner ends of two thermometric arms 14. The outer ends of these arms are fastened to the casing in any desired manner. With this form the free ends of the arms are arranged to press against the ends of the pallet so as to normally hold it against movement, that is, to take up any looseness and eliminate back-lash. When the arms warp or curl under the influence of heat one pushes and the other gives, and when they straighten the reverse action takes place so that in both cases the movement imparted to the pallet, and through the gear and pinion to the pointer, is uniform and is the resultant of the actions of the two thermometric arms.

The invention claimed is;

1. An oven thermometer having a casing, a spindle mounted in the casing, a pointer carried by the spindle, a pallet fixed on the spindle, and two thermometric arms mounted in the casing so as to warp, rotarily, in the same direction and having their free ends loosely engaging and pressing in opposite directions, rotarily, against the ends of the pallet.

2. An oven thermometer having a casing, a spindle mounted in the casing, a pointer carried by the spindle, a pallet fixed on the spindle, a thermometric arm mounted in the casing and having its free end loosely engaging and pressing against one end of the pallet in one direction, rotarily, and a thermometric arm mounted in the casing and having its free end loosely engaging and pressing against the other end of the pallet in the opposite direction, rotarily said thermometric arms being arranged to warp in the same direction.

3. An oven thermometer having a casing, two thermometric arms mounted therein so as to warp in the same direction, a pallet mounted in the casing and having its ends loosely engaged by the free ends of the thermometric arms, an indicator, and means connected with the pallet and turned thereby for transmitting the movement imparted to the pallet by the action of the thermometric arms, to the indicator.

ALBERT E. WHITTIER.

Witnesses:
GEO. W. PRIEST,
HORACE R. WHITTIER.

Copies of this patent may be obtained for five cents each, by addressing the "Commissioner of Patents, Washington, D. C."